United States Patent [19]
Mitchell

[11] Patent Number: 6,085,434
[45] Date of Patent: Jul. 11, 2000

[54] TELESCOPING MEASURING DEVICE

[76] Inventor: Monte Mitchell, 13803 W. 81st Ter., Lenexa, Kans. 66215

[21] Appl. No.: 09/053,987

[22] Filed: Apr. 2, 1998

Related U.S. Application Data

[60] Provisional application No. 60/042,792, Apr. 7, 1997.

[51] Int. Cl.[7] .................................................. G01C 15/00
[52] U.S. Cl. .................................. 33/809; 33/295; 33/296
[58] Field of Search .......................... 33/809, 293, 294, 33/295, 296, 484, 194, 668

[56] References Cited

U.S. PATENT DOCUMENTS

| | | |
|---|---|---|
| 509,096 | 11/1893 | Preston . |
| 1,031,517 | 7/1912 | Boyce . |
| 1,192,418 | 7/1916 | Hallberg . |
| 2,232,824 | 2/1941 | Maher . |
| 2,603,880 | 7/1952 | Dunn . |
| 3,168,305 | 2/1965 | Lee . |
| 3,190,008 | 6/1965 | Weiss ........................................ 33/809 |
| 3,492,737 | 2/1970 | Swanson ................................... 33/809 |
| 4,223,445 | 9/1980 | Goodland . |
| 4,766,673 | 8/1988 | Bolson ..................................... 33/761 |
| 5,070,620 | 12/1991 | Crain et al. .............................. 33/809 |

*Primary Examiner*—Christopher W. Fulton
*Attorney, Agent, or Firm*—Kyle L. Elliott; Blackwell Sanders Peper Martin

[57] ABSTRACT

A measuring device (20), having an outer base arm (22), an end arm (24), a plurality of intermediate arms (26, 28, 30, 32, 34), and a sequential deployment assembly (36), is utilized to take internal measurements with a high degree of accuracy. The sequential deployment assembly (36) operates to sequentially deploy the arms (24–34) as each arm reaches a fully deployed position. A longitudinal serial of graduations is operatively associated with the arms for an (24–34) operator to read distances therefrom.

12 Claims, 4 Drawing Sheets

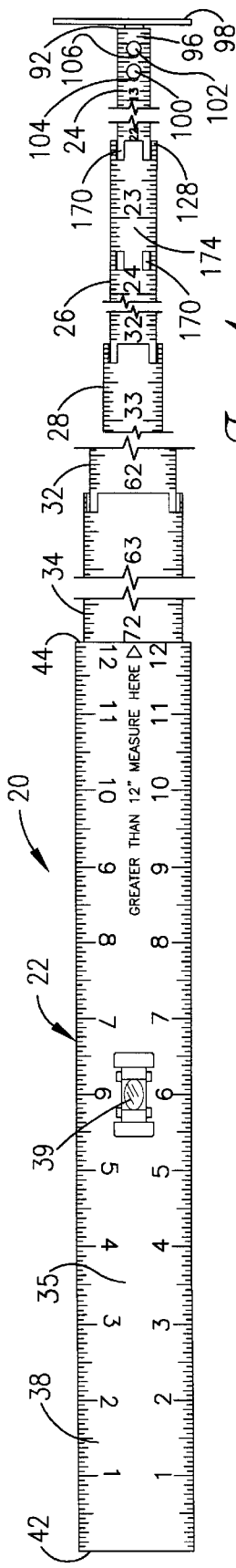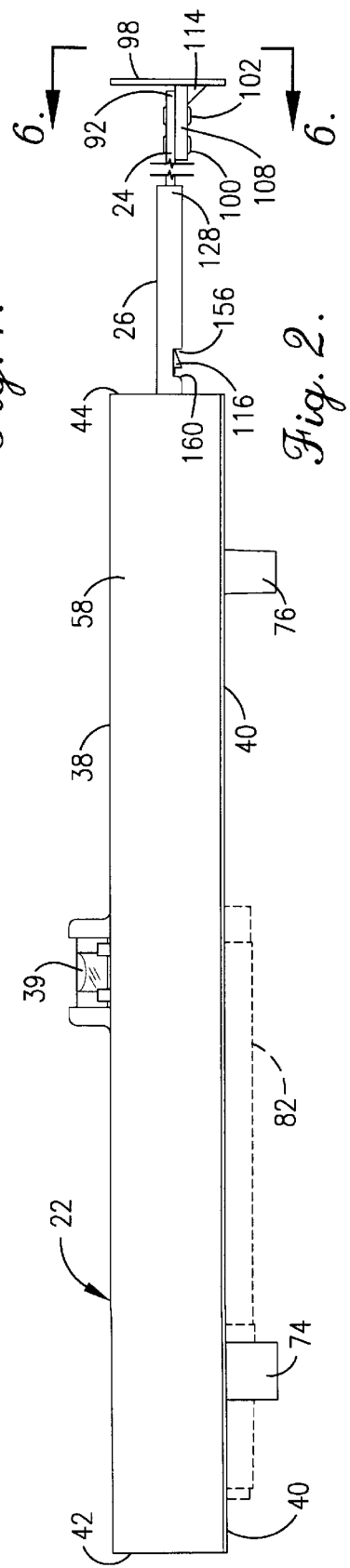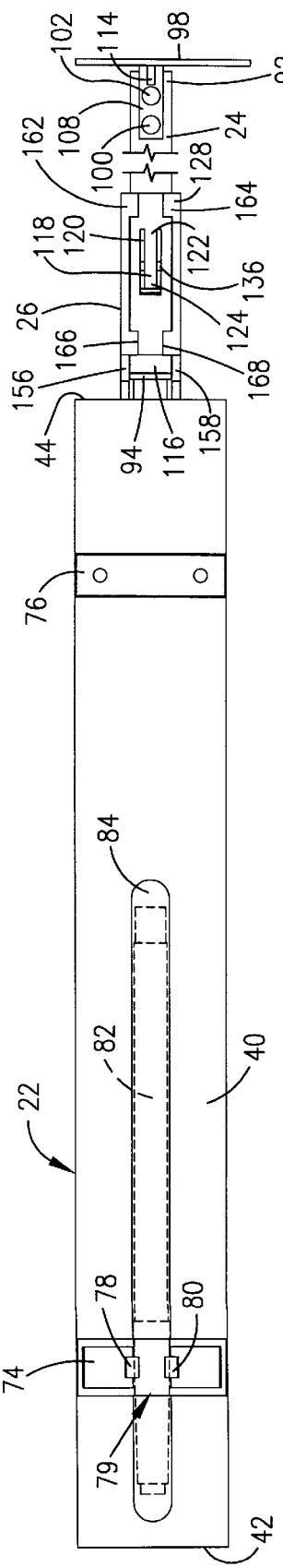

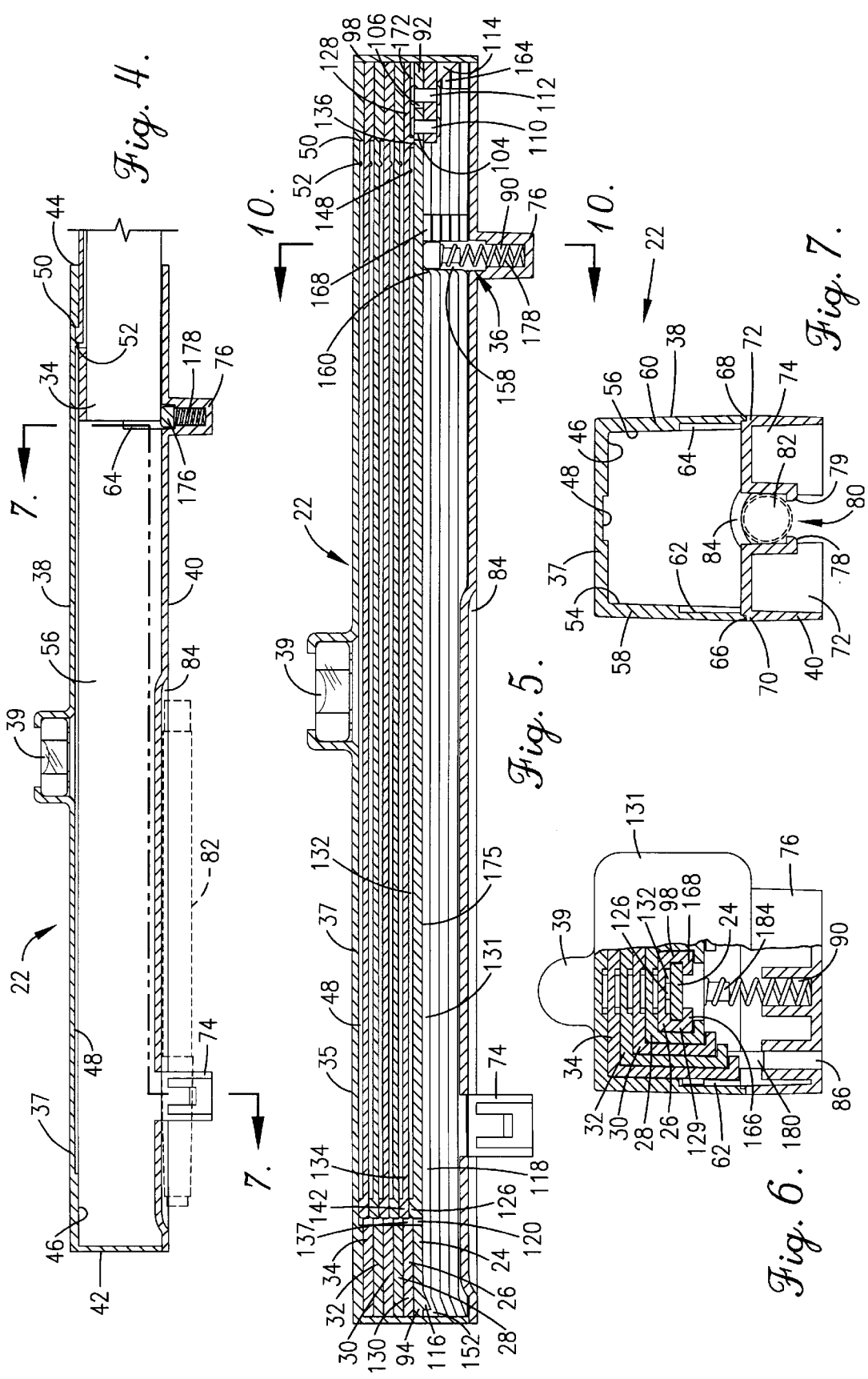

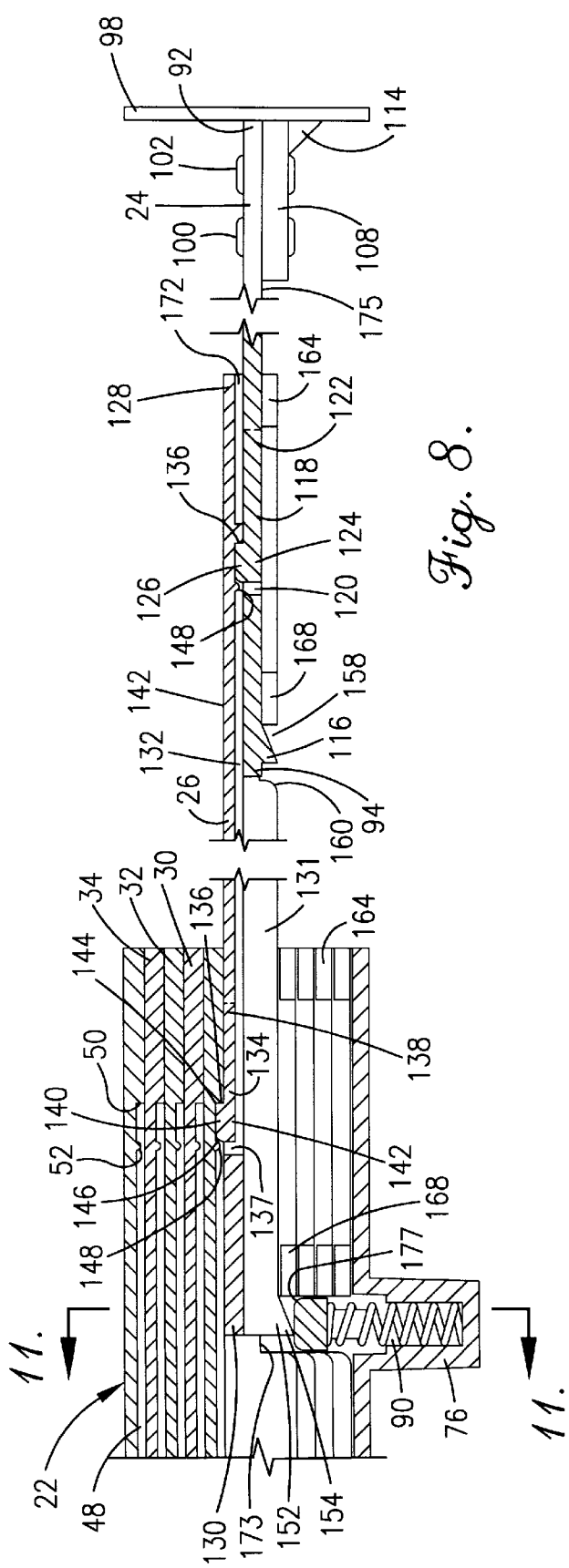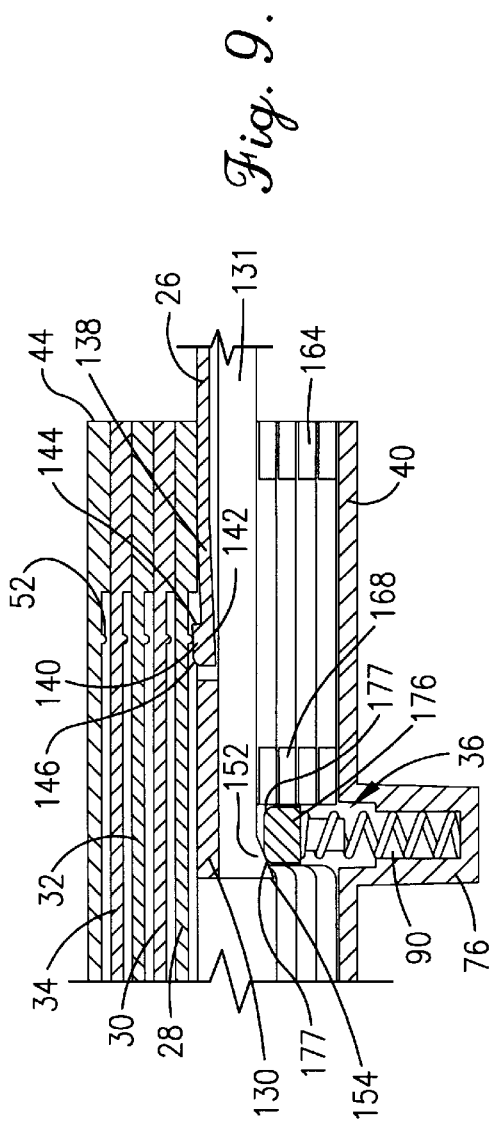

TELESCOPING MEASURING DEVICE

PRIOR APPLICATIONS

This application claims priority on previously filed U.S. Provisional Application filed Apr. 7, 1997 and having Application No. 60/042,792.

BACKGROUND OF THE INVENTION

This invention relates to measuring devices and, more particularly, to telescoping measuring devices having sequentially telescoping arms.

In carpentry and other fields, it is common to measure distances between two or more selected points. Currently, available measuring devices measure many distances, such as external distances bounded by at least one outside edge of a component, with sufficient accuracy. Frequently, however, the distances to be measured are defined between two components, so that the measurements must be taken internally. While it is typically critical that internal measurements be accurate, most currently available measuring devices are not adapted to take internal measurements with a high degree of accuracy leading to reduced quality products, increased production time, and increased production cost.

The currently available measuring devices generally lack the ability to confirm that measurements are being taken across the shortest distance between two components. Further, many of these devices, such as tape measures, exhibit a tendency to bend when taking internal measurements resulting in erroneous measurements. Thus, the accuracy of the measurement depends more on the skill of the operator than the measuring device used. Additionally, some of these devices are expensive and bulky thereby impairing their use.

Thus, increasing internal measurement accuracy, while maintaining high external measurement accuracy, is desirable to enhance the quality of products, increase production rate, and reduce production cost. It is also desirable to consistently obtain accurate measurements with reduced reliance on the skill of the operator. Additionally, it is desirable to provide a measuring device that is compact and reasonably priced.

BRIEF SUMMARY OF THE INVENTION

There is, therefore, provided in the practice of the invention a novel telescoping measuring device with a a base arm, a sequentially telescoping end arm, and at least one sequentially telescoping intermediate arm joining the base arm and the end arm. A longitudinal serial of graduations is operatively associated with the base arm, end arm, and intermediate arms for measuring distances between selected points.

In a preferred embodiment, the device includes a plurality of sequentially telescoping intermediate arms including a last intermediate arm juxtaposed to and held substantially within the base arm. The last intermediate arm has a catch and the base arm includes a catch ledge for engagement with the catch to fix the last intermediate arm in a fully displayed position. The longitudinal serial of graduations is preferably imprinted on the arms with a portion of the serial increasing in a first direction on the base arm and the remainder of the serial increasing in a second direction opposite the first direction.

The device also preferably includes a sequential deployment assembly having a movable cross bar extending through stop slots in the intermediate arms. The sequential deployment assembly also includes a resilient member biasing the moveable cross bar into the stop slots. The intermediate arms also include push down ramps to move the cross bar sequentially out of the stop slots to attain sequential deployment of the intermediate arms.

There is also provided in the practice of the invention a novel method for measuring internal distances between selected points. The method comprises abutting a zero end of the device against one of the selected points and fully deploying the end arm. Thereafter, the first intermediate arm is deployed until a measuring end of the end arm abuts another of the selected points.

In a preferred embodiment the method also includes the steps of preventing the first intermediate arm from deploying until the end arm is fully deployed and holding the end arm in the fully deployed position while deploying the first intermediate arm. Further, the cross bar engages the first intermediate arm to prevent the first intermediate arm from deploying while the end arm is being deployed, and a push down ramp of the end arm progressively pushes the cross bar out of engagement with the first intermediate arm when the end arm is fully deployed.

Accordingly, it is an object of the present invention to provide an improved measuring device for taking internal and external measurements.

It is a further object of the present invention to provide an improved method for measuring internal distances between selected points.

BRIEF DESCRIPTION OF THE DRAWINGS

These and other inventive features, advantages, and objects will appear from the following Detailed Description of The Preferred Embodiments when considered in connection with the accompanying drawings in which similar reference characters denote similar elements throughout the several views and wherein:

FIG. 1 is a top plan view of a telescoping measuring device according to the present invention;

FIG. 2 is a side elevational view of the measuring device of FIG. 1;

FIG. 3 is a bottom plan view of the measuring device of FIG. 1;

FIG. 4 is a fragmentary longitudinal cross sectional view of the measuring device of FIG. 1 in fully deployed configuration;

FIG. 5 is a longitudinal cross sectional view of the measuring device of FIG. 1 in a fully retracted configuration;

FIG. 6 is a partial cross sectional view of the measuring device of FIG. 1 taken from the perspective of line 6—6 in FIG. 2;

FIG. 7 is a transverse cross sectional view of the measuring device of FIG. 1 taken along line 7—7 in FIG. 4;

FIG. 8 is a fragmentary longitudinal cross sectional view of the measuring device of FIG. 1 in a partially deployed configuration;

FIG. 9 is a fragmentary longitudinal cross sectional view of the measuring device of FIG. 1 illustrating an intermediate arm just prior to full deployment;

DETAILED DESCRIPTION OF THE PREFERRED EMBODIMENTS

Figure 10:
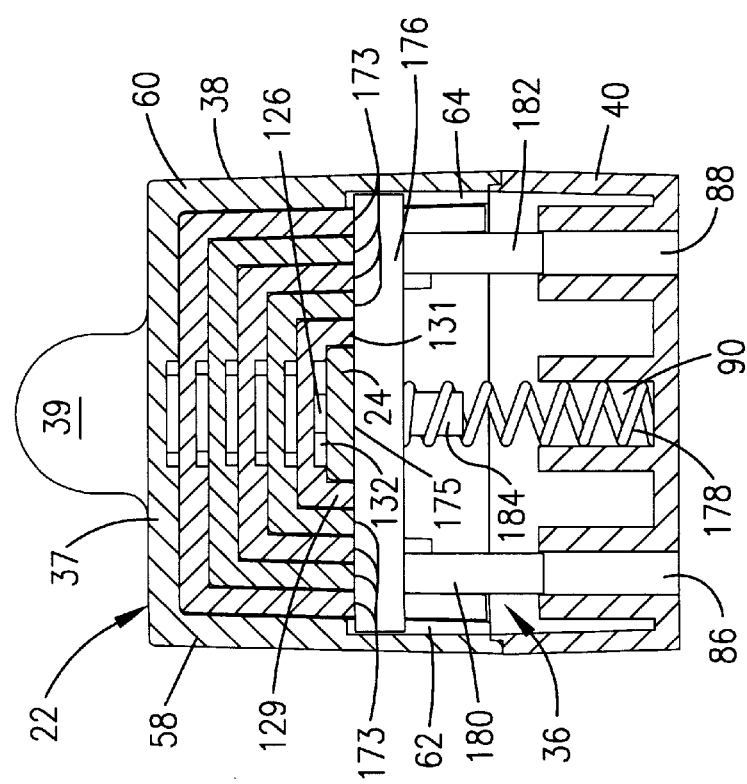
FIG. 10 is a transverse cross sectional view of the measuring device of FIG. 1 taken along line 10—10 in FIG. 5.

Referring to the drawings in greater detail, FIG. 1 shows a measuring device 20 having an outer base arm 22, an end arm 24, a plurality of intermediate arms 26, 28, 30 (FIG. 5), 32, 34, and a sequential deployment assembly 36 (FIG. 10). The sequential deployment assembly 36 allows the end arm 24 to be deployed while holding the intermediate arms within the base arm 22. After the end arm 24 is fully deployed, the deployment assembly allows the first intermediate arm 26 to be deployed while holding the other intermediate arms within the base arm 22 to sequentially deploy all the intermediate arms as required to take a measurement.

Referring to FIGS. 1–4, the outer base arm 22 operates as a generally rectangular housing for the end arm and intermediate arms. The housing is preferably bifurcated into a top portion 38 and a bottom portion 40 both formed of UV resistant material which can erasably receive written information. The material is preferably of sufficient rigidity, such as for example, ABS or HIS plastics, extruded aluminum, or other rigid materials to preclude bending when the device 20 is fully deployed.

The top portion 38 is preferably provided with a longitudinal serial of graduations including numerals 1–12 on an outer reading surface 35 (FIG. 1) of a top wall 37 (FIG. 4). A spirit level 39 is centrally attached to the base arm top wall 37 on the same surface as the serial of graduations. The top portion has a flat zero end 42 and a reading end 44 opposite the zero end with the serial of graduations increasing in a first direction from the zero end to the reading end.

Referring to FIGS. 4 and 7, a top inner surface 46 of the top portion 38 defines a central catch channel 48 in the top wall 37 extending along the length of the base arm 22 and terminating with a catch ledge 50 adjacent to the reading end 44. A rounded retraction ridge 52 is formed in the central catch channel 48 in a direction transverse to the length of the channel 48, and is located adjacent to the catch ledge 50.

The inner surfaces 54, 56 of the sidewalls 58, 60 define deployment bar guide grooves 62, 64. The sidewalls 58, 60 terminate at bottom edges 66, 68 for connection to the opposite sides 70, 72 of the bottom portion 40 by RF welding, adhesive, or other connection means.

Referring to FIGS. 3 and 7, the bottom portion comprises two legs 74, 76 which are spaced apart along the length of the base arm 22. The first leg 74 is adjacent to the zero end 42 of the base arm 22 and defines a central passage 79 having internal facing clips 78, 80 forming a clamp to secure a writing utensil 82. The bottom portion is preferably formed with a shallow arcuate groove 84 coinciding with the central passage to form a writing receptacle for securely receive the writing utensil 82.

Figure 11:
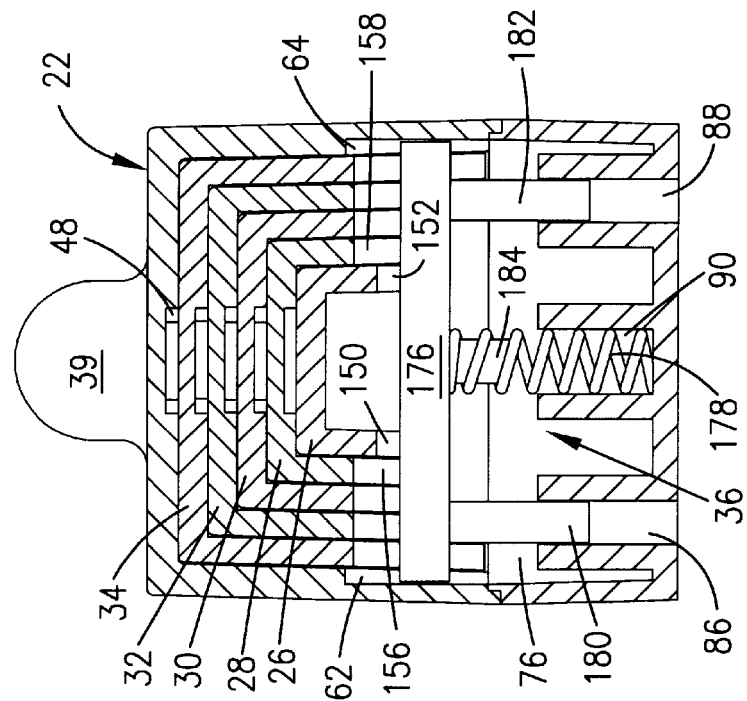
FIG. 11 is a transverse cross sectional view of the measuring device of FIG. 1 taken along line 11—11 in FIG. 8.

Referring to FIGS. 10 and 11, the second leg 76 is adjacent to the reading end 44 of the base arm 22 and defines a pair of spaced apart cylindrical guide leg apertures 86, 88. The second leg also defines a centrally located and cylindrical spring guide aperture 90 positioned between the guide leg appatures 86, 88. The guide apertures 86, 88, 90 cooperate with the sequential deployment assembly 36 for operation of the assembly.

Referring to FIGS. 1 and 5, the end arm 24 comprises a general flat elongated member preferably fabricated with the same material as the base arm 22. The end arm 24 has a measuring end 92 and a junction end 94 opposite the measuring end 92 where it joins to the first intermediate arm 26. The end arm 24 also includes a cooperating longitudinal serial of graduations including numerals 13–22 located on a reading surface 96 (FIG. 1) which faces the same direction as the reading surface 35 of the base arm 22. The cooperating serial increases in a second direction which is opposite to the first direction of increase of the serial of graduations on the base arm 22.

Referring additionally to FIGS. 3 and 6, the measuring end 92 has a slide foot 98 slidably attached thereto with conventional fasteners 100, 102 received in foot slots 104, 106. The foot slots 104, 106 are to elongated to a predetermined length allowing the foot 98 to slide toward the end arm for accurate internal measurements and slide away from the end arm for accurate external measurements. The slide foot has a tab 108 with circular apertures 110, 112 (FIG. 5) for receiving the fasteners 100, 102, and at least one support flange 114 to support the tab 108. The slide foot extends beyond the width of the outer base arm 22 past at least one of the sidewalls 58, 60 to hook over components for external measurements as best seen in FIG. 6.

Referring exclusively to FIGS. 3 and 8,, the junction end 94 of the end arm has a push down ramp 116 extending across the width of the end arm. Alternatively, the push down ramp can be bifurcated into two push down ramps preferably located on opposite sides of the end arm. A catch 118 is provided near the junction end 94. The catch is formed by a generally U-shaped opening 120 surrounding the catch 118. The U-shaped opening 120 allows the catch to pivot a small amount about its base end 122 where the catch is joined to the end arm. A catch end 124 is positioned opposite to the base end 122 and has a catch tab 126 extending upwardly from the reading surface 96 of the end arm.

Each of the intermediate arms 26, 28, 30, 32, 34, has substantially identical features. Therefore, the intermediate arms will be described with reference primarily to the first intermediate arm 26, and identical reference numerals will be used to identify the similar components of the intermediate arms. Brief references will be made to the second intermediate arm 28 to describe the interrelation of the intermediate arms.

Referring to FIGS. 3, 5, 6, and 8, the intermediate arm 26 preferably comprises a generally flat elongated member fabricated with the same material as the base arm 22 and having opposed side legs 129, 131 extending downwardly from the opposite sides thereof. The intermediate arm extends between a first/marking junction end 128 where it joins to the end arm and a second/push down junction end 130 where it joins to the second intermediate arm 28. A central catch channel 132, which is parallel to the length of the intermediate arm, is formed in one surface of the intermediate arm between the side legs 129, 131 to slidably receive the catch tab 126 of the end arm. The catch channel 132 is generally rectangular and extends from a catch 134 near the push down junction end 130 to a catch ledge 136 formed near the catch junction end 128.

The catch 134, which is configured like the end arm catch 118, is formed by a generally U-shaped opening 137 similar to the U-shaped opening 120 of the end arm. The catch is hingably connected to the intermediate arm at its base end 138 and has a catch tab 140 at its catch end 142 protruding upwardly from a reading surface 174 (FIG. 1). The reading surface 174 which is opposite the catch channel 132 and faces the same direction as the reading surfaces of the base arm and end arm. The catch tab includes a square catch corner 144 for secure engagement with the catch ledge 136 of the second intermediate arm 28 and a rounded retraction corner 146 for allowing the intermediate arm to be retracted.

The catch ledge 136 is square for secure engagement with the end arm catch 118, and a retraction ridge 148 is formed inside the catch channel adjacent to the catch ledge to hold the catch tab 126 of the end arm between the catch ledge 136 and the ridge. The ridge, which extends parallel to the catch ledge, is preferably rounded allowing the rounded corner of the end arm catch tab 126 to slide away from the catch ledge 136 when a deliberate force is applied in that direction.

The legs 129, 131 extend along the length of the intermediate arm and increase the intermediate arm's resistance to bending. Adjacent the push down end 130 of the intermediate arm, a pair of opposed push down ramps 150, 152 extend downwardly from the bottoms of the legs with one push down ramp on each leg. The push down ramps are generally triangular in cross section and are inclined in a direction from the marking end 128 to the catch end 130. Distal vertices 154 of the push down ramps extend downwardly until they match the height of the legs of the second intermediate arm 28.

The legs 129, 131 define opposed stop slots 156, 158 formed near the marking end 128. By opposed it is meant that the stop slots are formed at the same location along the length of the legs. The stop slots are generally rectangular with curved back corners 160 which allow the intermediate arm to slide smoothly past the sequential deployment assembly 36. When the end arm is fully deployed, the end arm push down ramp 116 is aligned with the stop slots as shown in FIG. 2.

Two pairs of opposed guide tabs 162–168 extend from the bottoms of the legs toward the middle of the intermediate arm. The guide tabs are generally rectangular and define a channel in which the end arm is slidably received and support the end arm when it is fully deployed. The front pair of guide tabs 162, 164 are juxtaposed the marking end 128 and the rear pair of guide tabs 166, 168 are spaced apart from the marking end 128 and the front pair of guide tabs 162, 164. Mold removal openings 170 (FIG. 1) are formed in the intermediate arm above each of the guide tabs 162–168 to affect the intermediate arm's removal from a mold.

The first intermediate arm 26 includes a fastener channel 172 which receives the fasteners 100, 102 when the end arm is fully and near fully retracted. The second 28, third 30, fourth 32, and fifth 34 intermediate arms do not include a fastener channel. The first intermediate arm also includes a cooperating longitudinal serial of graduations including numerals 23–32 located on the reading surface 174 (FIG. 1) which faces the same direction as the reading surfaces 35, 96 of the base arm 22 and the end arm 24. Each of the second, third, fourth, and fifth intermediate arms also include a cooperating longitudinal serial of graduations, but they include numerals 33–42, 43–52, 53–62, and 63–72 respectively. The cooperating serials of graduations of the intermediate arms, like the end arm serial, all increase in the second direction.

The side legs and the stop slots of the intermediate arms increase in depth from the first intermediate arm to the fifth intermediate arm, which is the last intermediate arm in the illustrated embodiment, so that all of the bases 173 (FIG. 10) of the stop slots are located substantially in the same plane as each other and preferably as the bottom surface 175 of the end arm. The intermediate arms also increase in width from the first intermediate arm 26 to the last intermediate arm, so that each intermediate arm is generally held within the next larger intermediate arm. Further, the side legs 129, 131 of each intermediate arm are held by the guide tabs 162–168 of the next larger intermediate arm. Therefore, the end arm and intermediate arms slide relative to each other and the base arm to telescope out of the base arm.

Referring to FIGS. 9–11, the sequential deployment assembly 36 assures that the arms deploy in sequence and includes a movable cross bar 176, a resilient biasing member 178, and a pair of guide legs 180, 182. The cross bar 176 is slidably received in the deployment bar guide grooves 62, 64 of the base arm. The cross bar 176 is preferably rectangular with rounded upper corners 177 and has a length extending across the width of the base arm perpendicular to the lengths of the base, end, and intermediate arms.

The biasing member 178 preferably comprises a compression spring held in the spring guide aperture 90. The spring 178 is coupled to the cross bar with a spring pin 184 extending from the bottom of the cross bar and into the cylindrical opening of the spring. The spring biases the cross bar upwardly in the base arm 22 to generally hold the cross bar in the stop slots 156, 158 of the intermediate arms.

The guide legs 180, 182 extend from the bottom surface of the cross bar into the guide leg apertures 86, 88. The guide legs are generally cylindrical and extend parallel to each other. Each of the guide legs has sufficient length to extend into the guide leg apertures when the arms are fully retracted.

In operation and referring first to FIG. 5, when the arms are fully retracted the cross bar 176 is forced upwardly into the stop slots 156, 158 of the intermediate arms and against the bottom surface 175 of the end arm and the bases 173 of the stop slots. To take a measurement, an operator aligns the zero end of the base arm 22 with a first selected point. The operator then grasps the slide foot 98 and extends the end arm 24 out of the base arm 22 until the slide foot is aligned with a second selected point. The operator then may remove the writing utensil 82, preferably a felt pen, from its receptacle and makes a mark at the reading end 44 of the base arm where the end arm meets the base arm. The marking end 128 of the intermediate arm, which is prevented from deploying by the cross bar 176, acts as a marking guide. The operator then reads where the mark is made on the longitudinal serial of graduations. Because the outer surface of the base arm can be written on, the operator can write the distance on the base arm and take further measurements recording each on the outer surface of the base arm. When the distances are no longer needed, the operator simply wipes them off. Thus, the device provides a convenient way to store a writing utensil and record measurements. To assure that the measurement is taken at the appropriate position on the device, an indicator is provided, stating, "GREATER THAN 12" MEASURE HERE" with a triangle pointing to the reading end 44 of the base arm 22.

If the measurement is greater than 22 inches, the end arm 24 is fully deployed bringing the end arm push down ramp 116 into contact with the movable cross bar 176. The end arm push down ramp overcomes the force of the compression spring 178 and pushes the movable cross bar out of the stop slots 156, 158 of the first intermediate arm, but the cross bar is not forced out of the deeper stop slots of the second, third, fourth, and fifth intermediate arms. As the movable cross bar is progressively forced out of the stop slots, the end arm catch 118 bends downwardly (FIG. 9) and moves over the retraction ridge 148 and comes into contact with the catch ledge 136 thereby fixing the fully deployed position of the end arm. The retraction ridge prevents the end arm from being inadvertently pushed out of its fully deployed position.

With the cross bar forced out of the stop slots, the first intermediate arm is free to slide out of the base arm while holding the second, third, fourth, and fifth intermediate arms inside the base arm. The operator then takes the measurement as described above. Thus, the cooperating serial of graduations allows an operator to take measurements beyond the magnitude of the serial of graduations on the base arm, and the cooperating serial of graduations on the first intermediate arm allows an operator to take measurements beyond the magnitude of the cooperating serial of graduations on the end arm.

If measurements of greater magnitude are required, the telescoping arms are sequentially deployed by the sequential deployment assembly 36. Similarly to the end arm 24, as the first intermediate arm 26 is nearly fully deployed (FIG. 9), the push down ramps 150, 152 of the first intermediate arm progressively force the cross bar 176 out of the stop slots of the second intermediate arm until the catch tab 140 of the first intermediate arm is held between the catch ledge 136 and ridge 148 of the second intermediate arm (FIG. 8). The curved corners 160 of the stop slots then slide smoothly over the rounded corners 177 of the cross bar, so that the operator can fully deploy the second intermediate arm which in turn releases the third intermediate arm for deployment.

The arms are sequentially deployed in sequence from the smallest inner most arm 24, to the largest outer most arm 34 which is juxtaposed to the base arm. As each arm is deployed to its fully deployed position, the sequential deployment assembly prevents the next arm and the other arms remaining in the base from deploying until the prior inner juxtaposed arm is fully deployed, so that push down ramps have forced the cross bar out of the stop slots of the next outer juxtaposed arm. Once an arm has been fully deployed, it is held in that position by the catch ledge and the retraction ridge until the operator forces the arm back into the prior arm. Preferably, the arms are fully retracted before each measurement.

For internal measurements the zero end is abutted against a component at a first selected point and the telescoping arms are sequentially deployed until the slide foot abuts against another component at a second selected point. For external measurements, the zero end is aligned with the first selected point, and the telescoping arms are sequentially deployed until the slide foot is hooked over the component at the second selected point. When a measurement is to be taken horizontally or vertically, the operator utilizes the spirit level (shown horizontally) to assure that the arms are extended across the shortest distance between the selected points.

The telescoping measuring device 20 according to the present invention provides an operator with the ability to take internal measurements with a high degree of accuracy and with minimal dependency on the skill of the operator. Further, the device is compact, inexpensive to manufacture, and provides a convenient writing surface for recording distances as well as place to store a writing utensil.

Thus, a measuring device is disclosed which utilizes a plurality of telescoping arms having cooperating serials of graduations to consistently measure internal and external distances with a high degree of accuracy. While preferred embodiments and particular applications of this invention have been shown and described, it is apparent to those skilled in the art that many other modifications and applications of this invention are possible without departing from the inventive concepts herein. For example, the outer base arm could be a unitary piece or formed with more than two pieces; the device could have various configurations such as triangular or circular as well as the generally rectangular configuration shown. It is, therefore, to be understood that, within the scope of the appended claims, this invention may be practiced otherwise than as specifically described, and the invention is not to be restricted except in the spirit of the appended claims. Though some of the features of the invention may be claimed in dependency, each feature has merit if used independently.

What is claimed is:

1. A telescoping measuring device for measuring distances between selected points, the measuring device comprising:

a base arm having a zero end for alignment with one of the selected points;

an end arm having a measuring end for alignment with another of the selected points;

a plurality of sequentially deployed, telescoping intermediate arms for sequential deployment between the base arm and the end arm, the intermediate arms comprising stop slots and push down ramps;

a longitudinal serial of graduations operatively associated with the base arm, end arm, and intermediate arms for measuring the distances between the selected points; and a sequential deployment assembly for sequentially deploying the end arm and the intermediate arms, and the deployment assembly includes:

a movable crossbar extending through the stop slots of the intermediate arms;

a resilient member biasing the movable cross bar into the stop slots; and the resilient member being overcome by the push down ramps as the intermediate arms are fully extended to move the crossbar sequentially out of the stop slots.

2. The measuring device according to claim 1 wherein the base arm comprises an outer base arm including a writing utensil receptacle, a spirit level, an outer writing surface for erasably receiving written information, and a portion of the longitudinal serial of graduations.

3. The measuring device according to claim 1 wherein the plurality of telescoping intermediate arms includes a last intermediate arm juxtaposed to and held substantially within the base arm, the last intermediate arm having a catch, and the base arm includes a catch ledge for engagement with the catch to fix a fully extended position of the last intermediate arm for accurate measurement.

4. The measuring device according to claim 1 wherein at least one intermediate arm includes a catch for engagement with a catch ledge of an outer juxtaposed intermediate arm and a catch ledge for engagement with a catch of an inner juxtaposed intermediate arm to fix fully extended positions of the intermediate arms for accurate measurement.

5. The measuring device according to claim 4 wherein the at least one intermediate arm further includes a backup ridge for holding the catch of the inner juxtaposed intermediate arm between the backup ridge and the catch ledge when the inner juxtaposed intermediate arm is fully extended.

6. The measuring device according to claim 1 wherein each intermediate arm includes two push down ramps and two stop slots increasing in depth from a first intermediate arm to a last intermediate arm; the resilient member comprises a compression spring; and the deployment assembly further includes guide legs extending from the movable crossbar and being received in guide leg apertures defined by the base arm, and a spring pin coupling the compression spring with the movable crossbar.

7. The measuring device according to claim 1 wherein the plurality of intermediate arms comprises a series of telescoping arms progressing from an inner intermediate arm to an outer most intermediate arm, the intermediate arms define a plurality of stop slots with each intermediate arm having at least one stop slot, and the stop slots increase in depth from the inner most intermediate arm to the outer most intermediate arm.

8. A telescoping measuring device for measuring distances between selected points, the measuring device comprising:

a base arm having a longitudinal serial of graduations;

a sequentially deployed, telescoping end arm having a first cooperating longitudinal serial of graduations of grater magnitude than the serial of graduations on the outer base arm and deploying from the base arm for measurements beyond the serial of graduations on the base arm;

a sequentially deployed, telescoping intermediate arm having a stop slot, a push down ramp, a second cooperating longitudinal serial of graduations of greater magnitude than the first cooperating longitudinal serial of graduations and for deployment after the end arm and for measurements beyond the first cooperating longitudinal serial of graduations on the end arm; and a sequential deployment assembly having a movable crossbar extending through the stop slot of the intermediate arm, a resilient member biasing the movable cross bar into the stop slot, and the resilient member being overcome by the push down ramp as the intermediate arm is fully extended to move the crossbar sequentially out of the stop slot.

9. The measuring device according to claim 8 further comprising a plurality of sequentially deployed, telescoping intermediate arms, each intermediate arm having a cooperating longitudinal serial of graduations.

10. The measuring device according to claim 8 wherein the longitudinal serial of graduations increases in a first direction, and the first cooperating longitudinal serial of graduations and the second cooperating longitudinal serial of graduations increase in a second direction opposite the first direction.

11. The measuring device according to claim 8 further comprising a slide foot slidably connected to the end arm for taking external and internal measurements.

12. The measuring device according to claim 8 wherein the movable crossbar is slidably received in the base arm.

* * * * *